W. H. BEDDARD.
COIN TESTING MACHINE.
APPLICATION FILED OCT. 23, 1914.

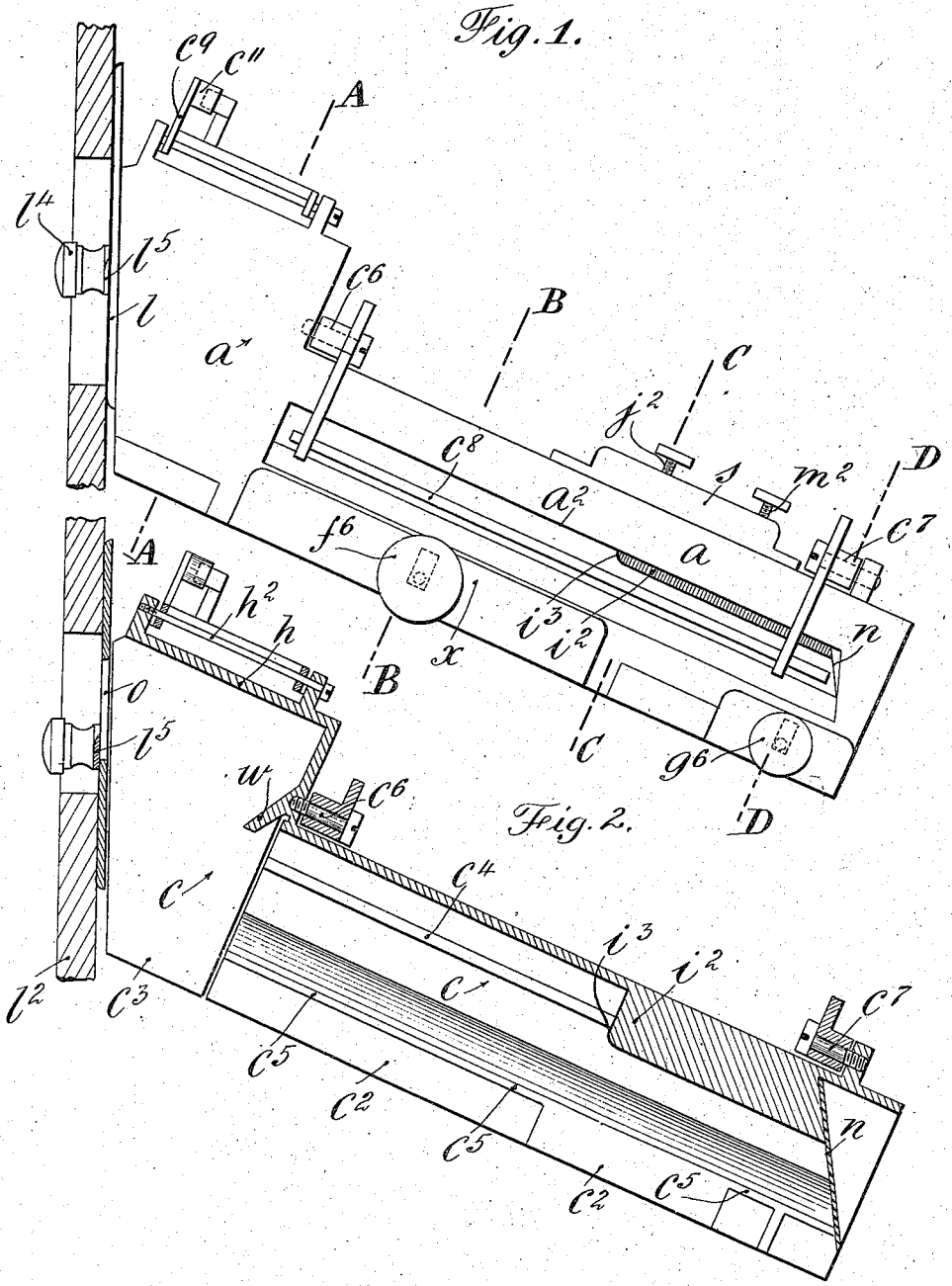

1,187,240.

Patented June 13, 1916.
4 SHEETS—SHEET 2.

Witnesses
M. E. McDade

Inventor
William H. Beddard
by James L. Norris, Attorney

W. H. BEDDARD.
COIN TESTING MACHINE.
APPLICATION FILED OCT. 23, 1914.

1,187,240.

Patented June 13, 1916.
4 SHEETS—SHEET 3.

Witnesses
M. E. McDade

Inventor
William H. Beddard
by James L. Norris
Attorney

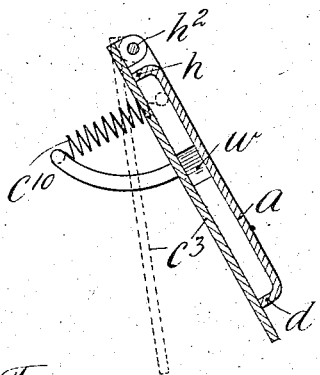
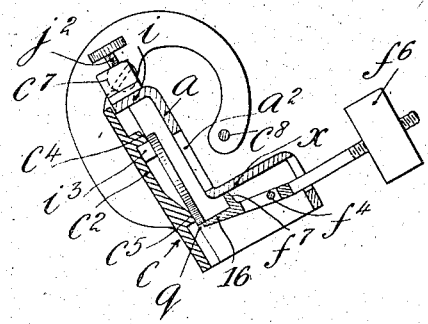
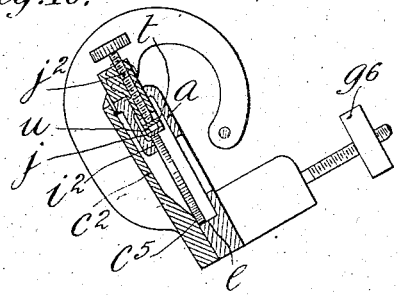
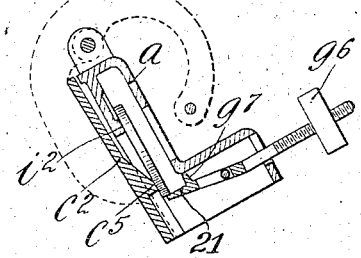
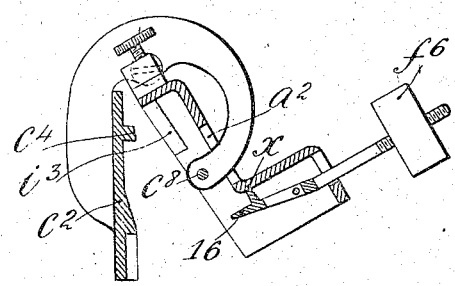

UNITED STATES PATENT OFFICE.

WILLIAM HENRY BEDDARD, OF SMALL HEATH, BIRMINGHAM, ENGLAND.

COIN-TESTING MACHINE.

1,187,240.

Specification of Letters Patent.  Patented June 13, 1916.

Application filed October 23, 1914. Serial No. 868,319.

*To all whom it may concern:*

Be it known that I, WILLIAM HENRY BEDDARD, subject of the King of Great Britain, residing at 123 Waverley road, Small Heath, Birmingham, England, have invented certain new and useful Improvements in Coin-Testing Machines, of which the following is a specification.

The invention provides a coin testing machine of improved construction, particularly suitable for testing coins before they are allowed to pass into an automatic coin operated delivery machine.

The machine tests coins as to character of metal, and only passes into the delivery machine coins which are of the exact metallic alloy, rejecting all others, the primary test being consequent upon the weight of the coin combined with the velocity with which it rolls down the coin chute against frictional resistance. The testing devices must work with accuracy, and the chute down which the coin rolls for testing, and which is inclined in two directions, must be kept clear of any rejected coins and rubbish.

The improvements hereinafter described and specifically claimed combine a combination of improved constructional features which may be employed in connection with features of the invention disclosed in my pending application Serial No. 710,271 and the primary features of the combination are a movable leaning side to the coin chute to open said chute both by hand and automatically, a pusher-out to forcibly clear the chute when said leaning side opens, and pivoted and weighted members which form parts of the bottom of the coin chute and have fixed bearings in said bottom instead of movable or shifting bearings.

The improvements will be clearly understood by the description hereinafter appearing with reference to the drawings, the transverse figures of which are correctly drawn as regards the transverse inclining of the coin chute, but the longitudinal figures of which are drawn looking straight at the machine for convenience of illustration.

Figure 3:
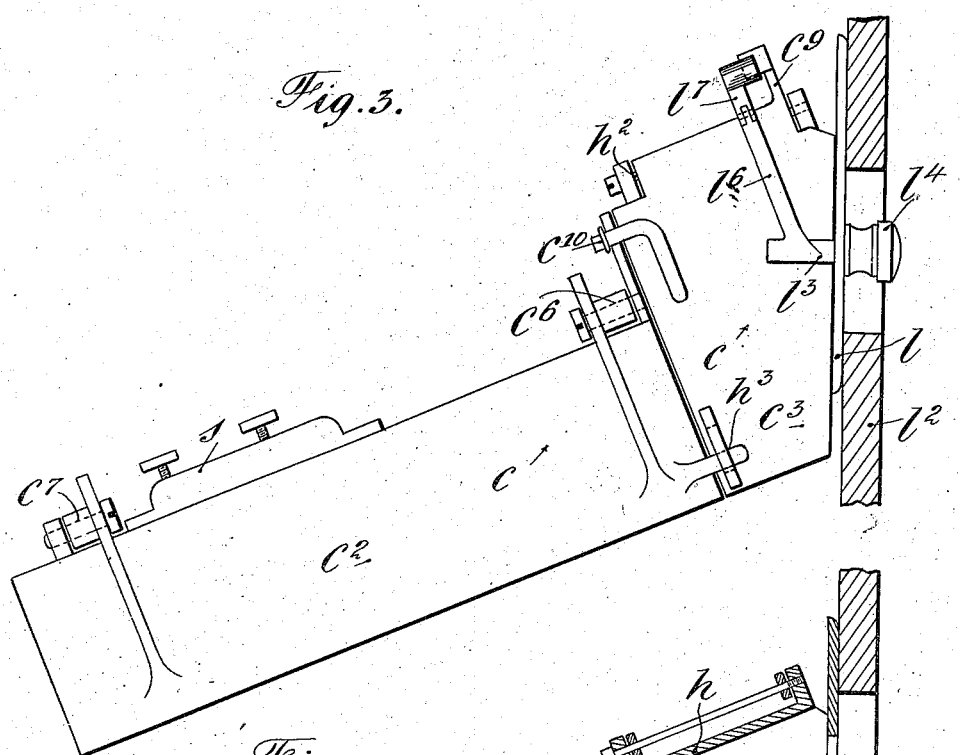
Figure 4:
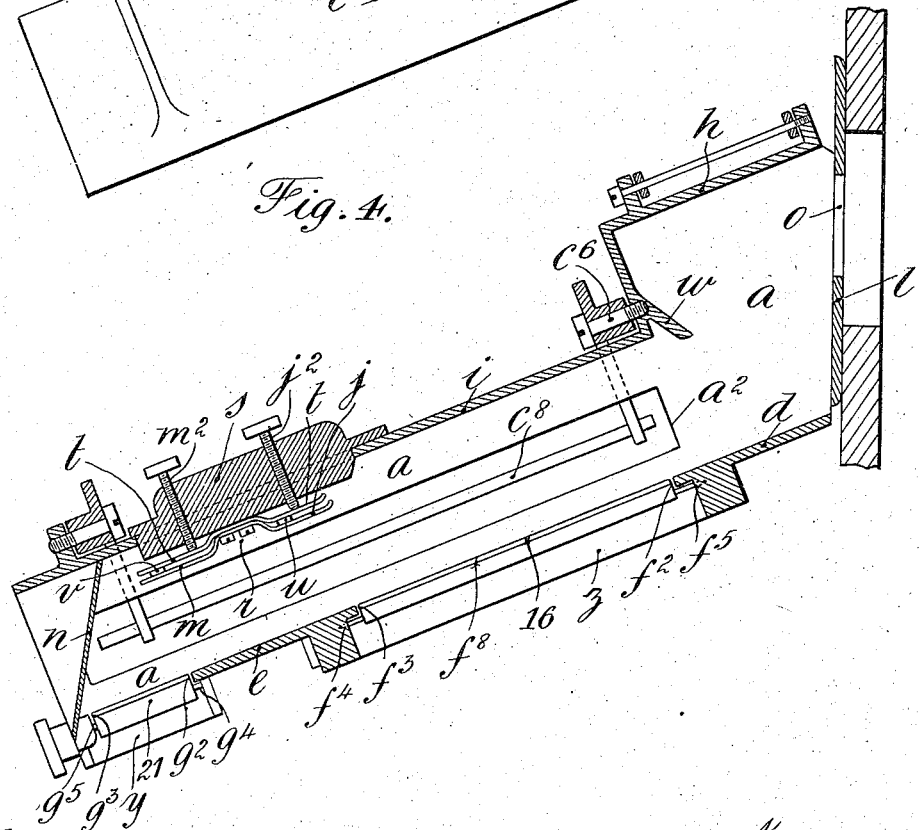
Figure 5:
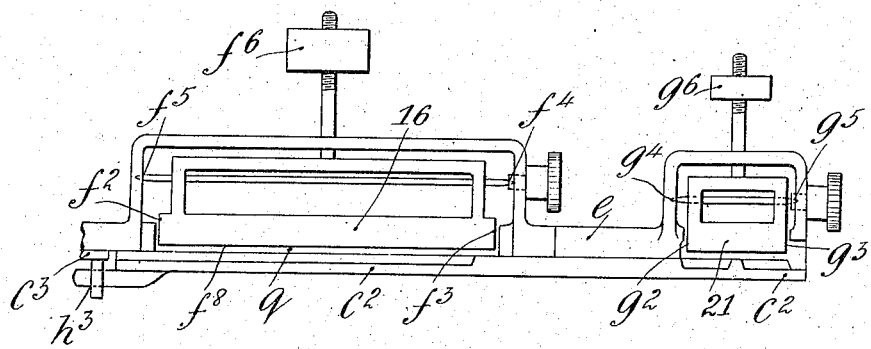
Figure 6:
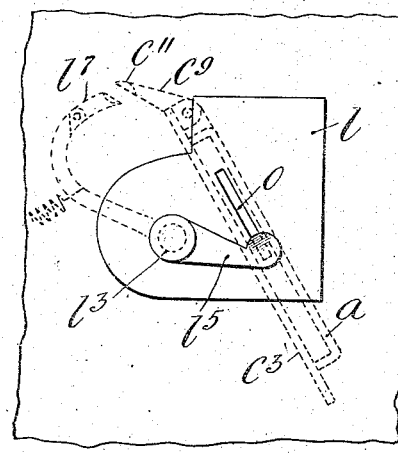
Figure 7:
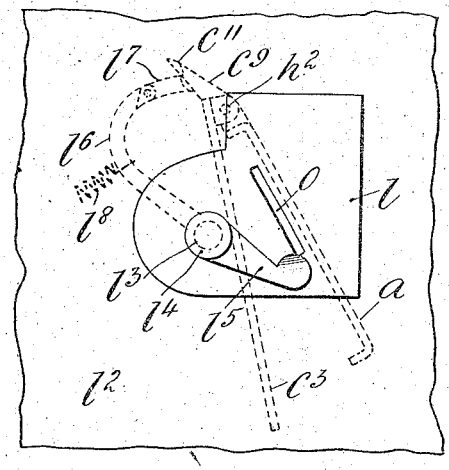

Figure 1 is an elevation of the one side of the coin testing machine. Fig. 2 is a side section of Fig. 1. Fig. 3 is an elevation of the other side of the machine. Fig. 4 is a side section of Fig. 3. Fig. 5 is an underside view of the greater part of Fig. 1. Fig. 6 is a front end elevation of Fig. 1 but correctly drawn to show the transverse inclining of the chute. Fig. 7 is a similar front end elevation as Fig. 6 but showing the different position of some of the parts. Fig. 8 is a section of Fig. 1 on the dotted lines A A. Fig. 9 is a section of Fig. 1 on the dotted lines B B. Fig. 10 is a section of Fig. 1 on the dotted lines C C. Fig. 11 is a section of Fig. 1 on the dotted lines D D. Fig. 12 is a similar section as Fig. 9 but with some of the parts in different positions.

The coin chute is represented by the fixed side $a$, movable side $c$, fixed bottom parts $d$ and $e$, movable bottom parts 16 and 21, fixed top parts $h$ and $i$, movable top parts $j$ and $m$, and inclined closed end $n$. The coin chute therefore extends from the coin slot $o$ to the closed end $n$.

$a^2$ is a large opening cut in the fixed side $a$. The movable side $c$ is formed of two hinged flaps $c^2$ and $c^3$, and these flaps form that side of the chute against which the one face of the coin makes frictional contact in rolling down the chute, but said coin also makes face frictional contact with the surface $i^2$ (which rigidly depends from the fixed top $i$ of the chute) if said coin rolls beyond the stop end $i^3$ of said surface, it being clear from the drawings that the inner face of the surface $i^2$ is accurately flush with the inner face of contact bars $c^4$ and $c^5$ rigidly carried upon the flap $c^2$. The flap $c^2$ swings from the fixed top $i$ of the chute upon the pivots $c^6$ and $c^7$, and operates to open the chute in the manner represented by Fig. 12, this flap being made to rigidly carry a pusher-out bar $c^8$ working through the opening $a^2$ in the fixed side $a$ to push out of the chute any coin or rubbish which may at the time become stationary therein. The flap $c^3$ is pivoted to the top $h$ by the pivot pin $h^2$ and at $h^3$ (see Fig. 3) is permanently connected to the flap $c^2$ by a pin and slot engagement so that when this flap $c^5$ swings to a position opening the chute, as shown by the dotted lines in Figs. 7 and 8, the flap $c^2$ swings with it so that the whole of the movable side of the chute from the coin slot $o$ to the closed end $n$ is opened to allow anything stationary in the chute to fall out, it being clearly understood that this opening side of the chute is the leaning side for coins. The flap $c^3$ carries a rigid projection $c^9$ from the movement of which, as will be hereinafter described, said flap is moved to open the chute, $c^{10}$ being a spring device to normally move the flap to close the chute.

The plate $l$ is a carrying and attachment plate for the machine to rigidly secure it to a suitable casing such as $l^2$. Said plate $l$ carries the coin slot $o$ aforesaid and also a rotatable spindle $l^3$ fitted with a knob $l^4$, a short arm $l^5$, and a long arm $l^6$. The knob $l^4$ is for hand rotation, the short arm $l^5$ normally covers up a portion of the coin slot $o$, and the long arm $l^6$ is fitted with a pawl $l^7$ to operate against the projection $c^9$. The coin slot $o$ is of the size of the correct coin, so that coins too large in diameter, or too thick, cannot be put into the machine and each time a coin is put through the slot $o$ the short arm $l^5$ is forced to rock the spindle $l^3$ and cause the pawl $l^7$ to operate against the projection $c^9$ to move the flaps $c^2$ $c^3$ to open the coin chute. Figs. 6 and 7 show clearly this action, and that by the time the short arm $l^5$ is clear of the coin slot the flaps $c^2$ $c^3$ are fully open, but before the coin has time to get wholly through the slot $o$, and drop into the chute said flaps have closed again, because the pawl $l^7$ has slipped off the projection $c^9$, after opening the flaps, and allowed the spring $c^{10}$ to quickly close the flaps again, the pawl $l^7$ moving back again to normal position around the back $c^{11}$ of the projection $c^9$. The long and short arms $l^6$ $l^5$ are returned to their normal positions immediately the coin has passed through the slot $o$ by the spring $l^8$. Before a coin is inserted into the coin slot $o$ the knob $l^4$ may be turned by hand to make it quite sure that the coin chute is clear of rejected coins or rubbish, but the provision of the short arm $l^5$ effects this automatically, and the action of the pawl $l^7$ and the projections $c^9$ make it quite sure that before the coin being put in through the slot $o$ reaches the coin chute the flaps $c^2$ $c^3$ shall be closed.

The movable bottom parts 16 and 21 to the chute are each a pivoted member capable of being depressed against the operation of an adjustable resistant. The member 16 forms the bottom of the chute from the point $f^2$ to $f^3$ and is evenly pivoted at its ends $f^4$ $f^5$ in the fixed bottom parts $d$ and $e$, so that the weight of a coin on it at any part in its length from $f^2$ to $f^3$ has the same effect as regards depressing it. The resistance to the depression of said member 16 is a weight $f^6$ which is adjustable to regulate the amount of weight required to depress said member. Said member 16 is stopped in its upward lift by the part $f^7$ of it contacting an extension $x$ of the fixed side of the chute. The member 21 forms the bottom of the chute from the point $g^2$ to $g^3$ and is exactly similar in construction to the member 16 but this member 21 depresses to let all correct coins pass out of the chute at the point $y$ into the delivery machine, or the like, whereas the member 16 would only in the case of an extremely heavy coin depress to such an extent as to let the coin through at $z$. The pivots of the member 21 are at $g^4$ $g^5$ in the fixed bottom of the chute, and the resistant is in the form of an adjustable weight $g^6$, while the upward lift of the member at the active end is limited by the stop projection $g^7$ operating against a fixed part of the chute. The pivots $g^4$ $g^5$ of the member 21 must be opposite at the ends of said member exactly the same as in respect of the member 16.

The inner surface of the closed end $n$ makes less than a right angle with the pivoted member 21 and a coin rolling onto said member 21 comes into collision with said closed end and receives a downward blow tending to force said coin to depress the member 21 and pass out of the chute by the outlet $y$. Between the edge $f^8$ of the member 16 and the bar $c^5$ of the flap $c$ is a slot $q$ shown clearly by Fig. 5, to let very thin coins through the outlet $z$, this slot running for the full length of the member 16. The movable top parts $j$ and $m$ are each a delicate leaf spring to have a wiping contact with the periphery of the coin as it rolls down the chute with its leaning face frictionally contacting the flap $c^2$. These two leaf springs are over the fixed bottom part $e$ of the chute. A free space $r$ is left between the two leaf springs $j$ and $m$ so that the coin is freed on its periphery as it passes from the leaf spring $j$ to the leaf spring $m$. Both leaf springs are carried by a bracket $s$ detachably fitted as a part of the top of the chute. The leaf springs $j$ and $m$ are set up to the bottom part $e$ by the independent set screws $j^2$ $m^2$, there being provided between each leaf spring and its particular set screw, an interior bearing piece $t$ for the end of the screw to operate against, distance pieces $u$ and $v$ being placed between the bearing pieces and the leaf springs with the idea of preventing the ends of the set screws impinging directly upon the delicate leaf springs and to give a more delicate adjustment in setting up the leaf springs to the bottom part $e$ of the chute.

The free space $r$ and the additional leaf spring $m$ are primarily for the rejection of an ill-shapen correct coin if such is desired. An ill-shapen correct coin would be more or less elliptical and therefore it may be stated that it would have a major and a minor axis. If the major axis contacted the first leaf spring $j$ the roll of the coin would be stopped, but if the minor axis the coin would be permitted to roll, but would surely contact the second leaf spring $m$ by its major axis, and therefore its progress through the testing machine would be stopped.

The operation of the machine is as follows: It has to allow only a coin composed of the correct metal alloy to pass through the pivoted member 21 and it has to keep the chute clear, and it will if desired reject a coin of the correct alloy if same is ill-shapen on its periphery. The coin is put into the slot $o$ and first strikes against the fixed shoulder $w$ which breaks the force putting the coin through the slot and allows the coin to start to roll from the bottom part $d$ by gravity only. The size of the slot $o$ prevents coins above a certain diameter and thickness being put into the machine at all. If when putting the coin into the slot $o$ there may be rubbish or another coin in the chute, said chute will be automatically cleared by the flaps $c^2$ $c^3$ opening, but quickly closing again when the chute is clear. The coin rolls from the bottom part $d$ over the pivoted member 16 with its one face leaning in frictional contact with the flap $c^2$. If the coin is of sufficient diameter its leaning face frictionally contacts the bars $c^4$ $c^5$, as shown by Fig. 9, so that the coin can roll on, but if its diameter is insufficient it will not touch the bar $c^4$ and will fall sidewise to be stopped in rolling down the chute by the end $i^3$, so that it will never reach the pivoted member 21. If the coin is very thin but large enough in diameter to contact the bar $c^4$ it may drop through the slot $q$, but in any case it will not roll quickly enough over the pivoted member 16 by reason of it being insufficient in weight. The pivoted member 16 is adjusted as regards depression to just allow a coin of the right weight and rolling only with the correct velocity to pass over it without depressing it although said coin would depress it if it stayed on the pivoted member 16 a moment too long, the period of time taken for the coin to roll over the pivoted member 16 being consequent upon the amount of frictional face contact of the coin with the bars $c^4$, $c^5$, such frictional contact being dependent in degree upon the metallurgical character of the alloy of which the coin is formed. If a coin be of the same weight, diameter, and thickness as the correct coin but does not roll across the pivoted member 16 with exactly the same velocity as the correct coin it will be stopped in its travel by a slight depression of the pivoted member 16, which would mean that the alloy of the coin was not the same as the correct coin, and that therefore the coin is rejected. Weight is not so important in connection with the pivoted member 16 as velocity, for the reason that a worn coin of the correct kind, and which is lighter in weight than a new coin, will pass over the pivoted member 16 because it has the correct velocity in rolling over the pivoted member 16. Any coin that depresses the pivoted member 16 to a sufficient extent is stopped in its travel, and here it will be clearly understood that a coin has the same effect from its weight on the pivoted member 16 no matter what position it may for the moment be in, on said member 16; therefore coins too little in diameter, too thin, and too heavy, and not of the same metal alloy would be stopped by the pivoted member 16. If an incorrect coin should pass the pivoted member 16 it is next tested by the leaf spring $j$ which has wiping contact with the coin's periphery at the same time as said coin is still rolling with face frictional contact against the hinged flap $c^2$, so that by the leaf spring $j$ a delicate test not only as to diameter but as to whether the coin is rolling with sufficient velocity to pass the leaf spring $j$ takes place. If the coin is ill-shapen on its periphery it is of somewhat elliptical form having a major and minor axis, and if the major axis contacted the leaf spring $j$ the coin would be stopped, whereas if the minor axis contacted the leaf spring $j$ the coin would pass this leaf spring $j$ but would be stopped by the leaf spring $m$, the major axis having at the time come uppermost by reason of the free space $r$ between the two leaf springs. The leaf springs $j$ and $n$ therefore give a velocity test, due to the character of the metal alloy, upon the periphery of the coin, and all coins not rolling with the correct velocity will not pass the leaf springs.

Assuming the coin has passed the leaf springs it then has to be let through the outlet $y$ by the pivoted member 21. This pivoted member will not let the correct coin through by weight alone; said correct coin will come into collision with the closed end $n$ which, dependent upon the velocity with which said coin strikes said end, will exert a downward pressure on the coin compelling it to pass through the pivoted member 21, said member 21 being set so that it will only let through it a coin which strikes the closed end $n$ with sufficient force and which has sufficient weight. Many coins will be rejected and stopped on the pivoted member 21. Every coin rejected by the machine is cleared from the chute by the operation of the flaps $c^2$ $c^3$ which form the leaning side of the chute, and provision would be made in the delivery machine to return all rejected coins to the person putting them in, so that if by accident a coin of greater value than the correct coin was put into the machine the person putting it in could get it returned by operating the knob $l^4$.

Having now described my invention what I claim and desire to secure by Letters Patent is:—

1. In a coin testing machine, the combination of a transversely inclined coin chute, a pair of longitudinally disposed leaf springs arranged adjacent the top of said chute in close association with one another but with an interval therebetween, said leaf springs serving to arrest the travel along said chute of coins which are deformed into elliptical shape, and means for ejecting laterally from the chute the coins arrested by said leaf springs.

2. In a coin testing machine, the combination of a transversely inclined coin chute, devices contained therein for arresting the travel down said chute of incorrect coins including a counter weighted bottom platform mounted on longitudinally disposed pivots at one side thereof and along which the coins roll, a leaning side wall for said chute movable to open position to liberate arrested coins, the side wall having upper and lower parallel contact rails to be frictionally engaged by a side face of a coin moving through said chute, and a fixed stop depending from the fixed top of the chute flush with said rails, said stop projecting across the space between said rails whereby to arrest any coin liberated from the upper rail in consequence of the depression of the bottom platform.

3. In a coin testing machine, the combination of a transversely inclined coin chute having an enlarged entrance part, devices contained in said chute for arresting the travel of incorrect coins, a movable leaning side to said chute to open to liberate arrested coins, said side comprising a pair of flaps, one pivotally suspended adjacent the chute proper and the other pivotally suspended adjacent said enlarged entrance part with its pivot above the pivot of the first flap, and a pin-and-slot connection between said flaps, whereby the second flap is caused to move pivotally with the first flap.

4. In a coin testing machine, the combination of a transversely inclined coin chute, a movable leaning side to said chute to open to liberate arrested coins, means for restoring said leaning side to normal position, said leaning side having rigid therewith an upward extension beyond its pivot, and a spring held lever provided with a pawl for engagement with said extension, said lever being operable against the tension of its spring to engage its pawl with said extension and effect the opening of said leaning side.

5. In a coin testing machine, a transversely inclined chute of a uniform width throughout its extent whereby the coin will roll from end to end thereof and having a continuous bottom including as a part thereof a movable platform mounted on pivots longitudinally disposed at one side of said chute, said chute having an enlarged entrance end directly communicating with the coin-insertion-slot and provided at a point immediately in advance of said platform with a projecting shoulder which overhangs said bottom and breaks the force of the coin upon its insertion in said chute, thereby causing the coin to start its rolling movement along the platform by gravity only.

In testimony whereof I have hereunto set my hand in presence of two subscribing witnesses.

WILLIAM HENRY BEDDARD.

Witnesses:
GEO. T. FUERY,
D. LEAKER.